Patented Aug. 12, 1924.

1,504,469

UNITED STATES PATENT OFFICE.

HERMANN FRITZSCHE AND EMIL REBER, OF BASEL, SWITZERLAND, ASSIGNORS TO SOCIETY OF CHEMICAL INDUSTRY IN BASLE, OF BASEL, SWITZERLAND.

AZO DYESTUFFS AND PROCESS FOR THE MANUFACTURE OF SAME.

No Drawing. Application filed October 8, 1923. Serial No. 667,407.

*To all whom it may concern:*

Be it known that we, HERMANN FRITZSCHE and EMIL REBER, both citizens of the Swiss Republic, and residing at Basel, Switzerland, have invented new and useful Azo Dyestuffs and Processes for the Manufacture of Same, of which the following is a full, clear, and exact specification.

The present invention relates to new pyrazolone dyestuffs which are of much importance for the production of uniform and fast tints on the fiber. The invention comprises the dyed fabrics or other materials, dyed with the new dyestuffs, as well as the new dyestuffs themselves.

Through the U. S. patent application Serial No. 667406, filed October 8, 1923, new 1-aryl-5-pyrazolones have become known which carry an $SO_2NH_2$ group in their aryl nucleus.

It has now been found that very valuable new azo dyestuffs may be obtained by coupling these aryl pyrazolones with diazo compounds. The new dyestuffs thus obtained correspond with the general formula—

$$R-N=N-R'$$

wherein R signifies an 1-aryl-5-pyrazolone which contains an $SO_2NH_2$ group in its aryl nucleus, and R' an aryl nucleus. These new azo dyestuffs form yellow to brown and red-brown powders, soluble in water to yellow to orange solutions. They dye wool in an acid bath in very uniform yellow to brown tints. If an o-oxydiazo compound has been chosen as a diazo compound the acid wool dyeings obtainable, when after-chromed, change to orange to blue-red tints of great purity which are fast to fulling and to potting.

The following examples illustrate the invention without, however, limiting the same.

Example 1.

The diazo-compound prepared in the usual manner from 173 parts of 2-amino-1-benzene-sulfonic acid is introduced into an aqueous solution containing 285 parts of 1-(3'-sulfamido)-phenyl-5-pyrazolone-3-carboxylic acid and an excess of sodium carbonate. The product is a yellow dyestuff which is filtered after addition of a little common salt. It forms a yellow powder dissolving in water to a yellow solution; it dyes wool in an acid bath beautiful greenish-yellow tints, very fast to light and very uniform.

If in this example, 5-methyl-2-amino-1-benzenesulfonic acid be substituted for the 2-amino-1-benzenesulfonic acid, there is obtained a golden-yellow dyestuff of like properties.

Example 2.

225 parts of 2-aminonaphthalene-1-sulfonic acid are dissolved in the usual manner and to the solution is added the diazo-compound obtained in an aqueous solution containing 255 parts of 1-(3'-sulfamido-6'-methyl)-3-methyl-5-pyrazolone and an excess of sodium carbonate. To the new dyestuff thus formed there is added a little common salt and it is filtered and dried. It then forms an orange powder which dissolves in water to a yellow solution and dyes wool in an acid bath beautiful golden-yellow tints which are excellently uniform and of good fastness to light.

The analogous dyestuff prepared from the diazo-compound of 4-aminobenzene-1-sulfonic acid dyes wool yellowish-green tints.

Example 3.

The diazo-compound prepared from 189 parts of 2-amino-1-oxybenzene-4-sulfonic acid is coupled as in the previous example with 253 parts of 1-(3'-sulfamido)-phenyl-3-methyl-5-pyrazolone. The dyestuff is isolated in the usual manner. It is a brown-red powder soluble in water to an orange solution which becomes yellow under action of alkalies. It dyes wool in an acid bath orange-yellow tints which by after-chroming are converted into orange-red tints.

Example 4.

272 parts of the sodium salt of the diazo-compound of 1-amino-2-oxynaphthalene-4-sulfonic acid are introduced into a cooled solution of 253 parts of 1-(3'-sulfamido)-phenyl-3-methyl-5-pyrazolone in caustic soda of 30 per cent strength. The mixture is stirred for some hours and the dyestuff then isolated by acidifying slightly with a mineral acid. The new dyestuff is filtered and may be purified by crystallization from water. It is a brick-red powder which dissolves in water to an orange solution, becoming more orange on addition of caustic soda. It dyes wool in an acid bath orange-brown tints which by after-chroming yield a pure blue-red, very fast.

By substituting in this example for the 1-(3'-sulfamido)-phenyl-3-methyl-5-pyrazolone, another aryl-3-methyl-pyrazolone containing a sulfamido group in the aryl-nucleus an analogous result is obtained, while if the corresponding arylpyrazolone-3-carboxylic acids are used the tints of the dyestuffs are notably more blue-red.

*Example 5.*

295 parts of the nitrated diazo-compound of 1-amino-2-oxynaphthalene-4-sulfonic acid are introduced into a cool solution of 253 parts of 1-(3'-sulfamido)-phenyl-3-methyl-5-pyrazolone and 50 parts of sodium carbonate in about 130 parts of water. The whole is stirred for some hours and the dyestuff then isolated by slightly acidifying the mixture with a mineral acid. The new dyestuff is then filtered. It may be purified by crystallization from water. It is a brown powder, soluble in water to an orange-brown solution becoming orange on addition of caustic soda. It dyes wool in an acid bath brown tints which by after-chroming become a very fast red.

What we claim is:

1. The herein described new azo dyestuffs which correspond with the general formula

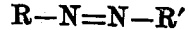

wherein R signifies a 1-aryl-5-pyrazolone which contains an $SO_2NH_2$ group in its aryl nucleus, and R' an aryl nucleus, which dyestuffs constitute yellow to red-brown and brown powders soluble in water to yellow to orange solutions, dyeing wool from an acid bath very uniform yellow to brown tints.

2. The herein described new azo dyestuffs which correspond with the general formula

wherein R signifies a 1-aryl-5-pyrazolone which contains an $SO_2NH_2$ group in its aryl nucleus, and R' a monosulfonated aryl nucleus, which dyestuffs constitute yellow to red-brown and brown powders soluble in water to yellow to orange solutions, dyeing wool from an acid bath very uniform yellow to brown tints.

3. The herein described new azo dyestuffs which correspond with the general formula

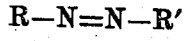

wherein R signifies a 1-aryl-5-pyrazolone which contains an $SO_2NH_2$ group in its aryl nucleus and R' a monosulfonated aryl nucleus which contains an OH group in ortho-position to the azo bridge, which dyestuffs constitute red-brown to brown powders soluble in water to orange to brown-orange solutions which change to yellow to orange on addition of alkalies, dyeing wool in an acid bath very uniform yellow-orange to brown tints which, by after-chroming, become orange to blue-red, the dyeing being very fast to fulling and to potting.

4. The herein described new azo dyestuffs which correspond with the general formula

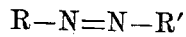

wherein R signifies a 1-aryl-3-methyl-5-pyrazolone which contains an $SO_2NH_2$ group in its aryl nucleus, and R' a monosulfonated aryl nucleus which contains an OH group in ortho-position to the azo bridge, which dyestuffs constitute red-brown to brown powders soluble in water to orange to brown-orange solutions which change to yellow to orange on addition of alkalies, dyeing wool in an acid bath very uniform yellow-orange to brown tints which, by after-chroming, become orange to blue-red, the dyeings being very fast to fulling and to potting.

5. The herein described new azo dyestuffs which correspond with the general formula

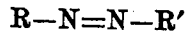

wherein R signifies a 1-aryl-3-methyl-5-pyrazolone which contains an $SO_2NH_2$ group in its aryl nucleus, and R' a 2-oxynaphthalene-4-sulfonic acid nucleus where the azo bridge adheres to the position 1- of the naphthalene nucleus, which dyestuffs constitute red-brown to brown powders soluble in water to orange to brown-orange solutions which become more yellow and more pure on addition of alkalies, dyeing wool in an acid bath very uniform brown to orange tints which, by after-chroming, become red to blue-red, the dyeings being very fast to fulling and to potting.

6. The herein described new azo dyestuffs which correspond with the general formula

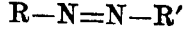

wherein R signifies a 1(3'-sulfamido)-aryl-3-methyl-5-pyrazolone, and R' a 2-oxynaphthalene-4-sulfonic acid nucleus where the azo bridge adheres to the position 1- of the naphthalene nucleus, which dyestuffs constitute red-brown to brown powders soluble in water to orange to brown-orange solutions which become more yellow and more pure on addition of alkalies, dyeing wool in an acid bath very uniform brown to orange tints which, by after-chroming, become red to blue-red, the dyeings being very fast to fulling and to potting.

7. As new product the herein described new azo dyestuff which corresponds with the formula

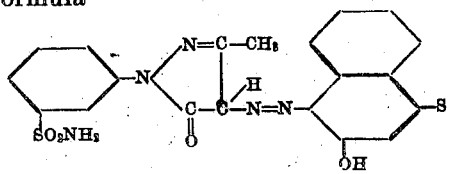

constituting a brown-red powder soluble in water to an orange solution which becomes more yellow on addition of alkalies and dyeing wool in an acid bath very uniform brown-orange tints which, by after-chroming, become a pure blue-red, the dyeings being very fast to fulling and to potting.

8. Material dyed with the dyestuffs of claim 1.

9. Material dyed with the dyestuffs of claim 2.

10. Material dyed with the dyestuffs of claim 3.

11. Material dyed with the dyestuffs of claim 4.

12. Material dyed with the dyestuffs of claim 5.

13. Material dyed with the dyestuffs of claim 6.

14. Material dyed with the dyestuffs of claim 7.

In witness whereof we have hereunto signed our names this 27th day of September 1923, in the presence of two subscribing witnesses.

HERMANN FRITZSCHE.
EMIL REBER.

Witnesses:
 AMAND BRAUN,
 JOSEPH SÜTTERLIN.